US 9,047,410 B2

(12) United States Patent
Markande et al.

(10) Patent No.: US 9,047,410 B2
(45) Date of Patent: Jun. 2, 2015

(54) CLOUD-BASED APPLICATION TESTING

(71) Applicant: Infosys Limited, Bangalore (IN)

(72) Inventors: Krishna Markande, Bangalore (IN); Sridhar Murthy Jayaram, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/943,688

(22) Filed: Jul. 16, 2013

(65) Prior Publication Data

US 2014/0026122 A1     Jan. 23, 2014

(30) Foreign Application Priority Data

Jul. 19, 2012 (IN) ............... 2945/CHE/2012

(51) Int. Cl.
G06F 9/44 (2006.01)
G06F 11/36 (2006.01)
(52) U.S. Cl.
CPC ................... G06F 11/3664 (2013.01)
(58) Field of Classification Search
CPC ....................................... G06F 11/34–11/3696
USPC .................. 717/124–135; 714/799–824
See application file for complete search history.

(56) References Cited

U.S. PATENT DOCUMENTS

| 8,752,017 | B2 * | 6/2014 | Hossain et al. | 717/124 |
| 2003/0212989 | A1 * | 11/2003 | Rokosz | 717/135 |
| 2009/0300423 | A1 * | 12/2009 | Ferris | 714/38 |
| 2010/0228819 | A1 | 9/2010 | Wei | |
| 2010/0332818 | A1 * | 12/2010 | Prahlad et al. | 713/150 |
| 2011/0010691 | A1 * | 1/2011 | Lu et al. | 717/124 |
| 2011/0145836 | A1 | 6/2011 | Wheeler et al. | |
| 2012/0017156 | A1 | 1/2012 | Broda et al. | |
| 2013/0054792 | A1 * | 2/2013 | Sharaf | 709/224 |
| 2013/0067298 | A1 * | 3/2013 | Li et al. | 714/799 |

FOREIGN PATENT DOCUMENTS

WO    WO 2011/145116    11/2011

OTHER PUBLICATIONS

Zhang, Linghao, et al. "Environmental modeling for automated cloud application testing." Software, IEEE 29.2 (2012), pp. 30-35.*
Vengattaraman, T., P. Dhavachelvan, and R. Baskaran. "A model of cloud based application environment for software testing." arXiv preprint arXiv:1004.1773 (2010), pp. 257-260.*

(Continued)

Primary Examiner — Satish Rampuria
(74) Attorney, Agent, or Firm — Klarquist Sparkman, LLP

(57) ABSTRACT

Cloud-based testing of applications allows an application under test (AUT) to be subjected to test loads mimicking expected high volume real-time production loads. Test loads can be applied from geographically distributed test load sources. During testing, the system can monitor usage of AUTs and the underlying cloud infrastructure (virtual machines, test servers, etc.) on which the AUT is executing. An AUT can be scaled, for instance, additional instances of the application can be started, and additional virtual machines can be configured and test servers provisioned if AUT or infrastructure usage exceeds specified thresholds during testing. A testing services provider can supply a web-based unified management console from which admins and test users can manage AUT testing.

18 Claims, 7 Drawing Sheets

(56) References Cited

OTHER PUBLICATIONS

Chan, W. K., Lijun Mei, and Zhenyu Zhang. "Modeling and testing of cloud applications." Services Computing Conference, 2009. APSCC 2009. IEEE Asia-Pacific. IEEE, 2009, pp. 111-118.*

Somenath Nag, "Business Case for Cloud Based Testing," Blue Star Infotech, <http://www.bsil.com/resource-center-%281%29/white-papers/02---business-case-for-cloud-based-testing-pdf.aspx>, 7 pages (accessed May 30, 2012).

"Test your limits," Information Technology Testing at Platform Lab, downloaded from http://www.platformlab.org/testing.html, 1 page (accessed Jun. 12, 2012).

Jun et al., "Software Testing Based on Cloud Computing," International Conference on Internet Computing and Information Services (ICICIS) 2011, 3 pages.

Riungu-Kalliosaari et al., "Testing in the Cloud: Exploring the Practice," IEEE Software, Mar./Apr. 2012, 6 pages.

Ganon et al., "Cloud-based Performance Testing of Network Management Systems," in proceeding of CAMAD '09, IEEE 14 International Workshop (2009), 6 pages.

Roebuck, "Cloud Testing: High-impact Emerging Technology—What You Need to Know: Definitions, Adoptions, Impact, Benefits, Maturity, Vendors" Tebbo Publishing, 12 pages, (2011).

Miller, "Under the Cloud: The Decades of Nuclear Testing" Two-Sixty Press, Parts V-VII, 142 pages, (1999).

Rajkumar et al., "Cloud Computing: Principles and Paradigms," John Wiley Publication, Sections 1.6, 5.2, 21.2, Part IV, and Chapter 6, 86 pages, (2011).

* cited by examiner

CLOUD-BASED APPLICATION TESTING

BACKGROUND

One approach to ensure that an enterprise software application has sufficient resources to perform adequately and reliably under peak test and production loads is for a software developer to provision sufficient computing resources on-premises. However, the costs associated with acquiring, building and maintaining computing infrastructure can be prohibitive expensive. As a result, developers have turned to outsourcing the procurement, maintenance and management of computing infrastructure, and the hosting and testing of applications to third-party cloud service providers.

SUMMARY

This Summary is provided to introduce a selection of concepts, in a simplified form, that are further described hereafter in the Detailed Description. This Summary is not intended to identify key features or essential features of the claimed subject matter nor is it intended to be used to limit the scope of the claimed subject matter.

Disclosed are cloud-based testing technologies that allow software developers to test applications in a cloud environment, which allow the applications to be subjected to high volume test loads that mimic loads the applications are expected to be subjected to in real-time when released for production use. The disclosed technologies are capable of scaling an application under test (AUT) and underlying cloud resources in response to changes in test load volume. For example, as the test load applied to an application increases, a cloud-based test system can increase the number of instances of the application executing in the cloud, and increase the number of virtual machines and physical test servers available for testing the application. Applications can be tested in multiple clouds of various types (private, public or hybrid), and users can manage the testing of applications through a single web-based unified management console.

In one embodiment, an application is deployed to one or more clouds for testing, test loads to be applied to the application during testing are configured; the application is tested; a usage metric generated during testing of the application (such as application response time or throughput) is determined to exceed a test condition of the application; and the application or the cloud infrastructure available to test the application is scaled.

In another embodiment, an application is deployed to a cloud that has a higher priority than an application currently being tested in the cloud. The lower-priority application is throttled down or suspended while the higher-priority application is being tested, and the lower-priority application is throttled back up or resumes when testing of the higher-priority application has ended.

The foregoing and other objects, features and advantages of the invention will become more apparent from the following detailed description, which proceeds with reference to the accompanying figures.

DETAILED DESCRIPTION

Example 1

Exemplary Cloud-Based Testing System

Figure 1:
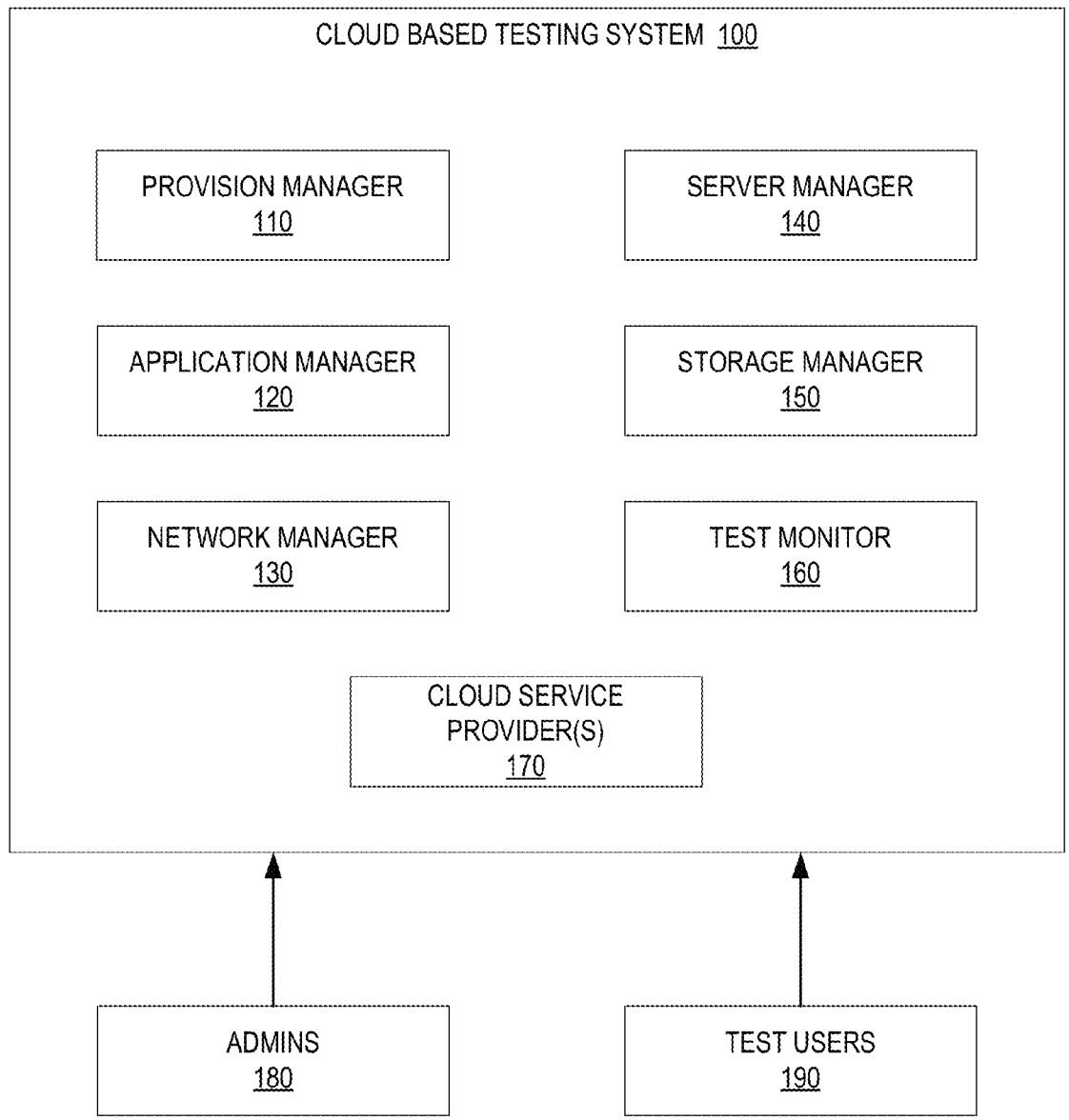
FIG. 1 is a block diagram of a cloud-based testing system.

FIG. 1 is a block diagram of an exemplary cloud-based testing system (or platform) 100 for testing a software application. The system 100 comprises a provision manager 110, an application manager 120, a network manager 130, a server manager 140, a storage manager 150, a test monitor 160, and one or more cloud service providers 170. The system 100 can be accessed by admins 180 and test users 190 of a software developer enterprise.

The system 100 utilizes the infrastructure or resources of one or more clouds to test an application under test (AUT). Cloud infrastructure can be provided by cloud service providers. In some embodiments, the system 100 can leverage existing relationships between software application developers (developers) and cloud service providers (providers) by which a provider has agreed to provide a given level of cloud resources (e.g., computing, memory, network and security resources) to a developer. A user can use the system 100 to deploy applications and test servers; start, stop, pause, resume and throttle down/up applications in the cloud; and access test results, usage metrics and audit reports.

The provision manager 110 manages application deployment to and un-deployment from a cloud, and the configuring, starting, stopping, suspending, resuming, throttling down or up, and terminating of an application. The provision manager 110 allows for the configuration of application testing parameters such as the clouds on which an application is to be hosted, test loads under which an application is to be tested, the percentage of tests an application is to pass in order for the application to be considered as having passed testing, target application response time and target application throughput. The provision manager 110 can cause the testing an AUT to begin, for example, at a specified time, when cloud computing resources become available for testing a deployed AUT, or in response to a user indicating that testing of an AUT is to begin. For example, the provision manager 110 can maintain a list of deployed AUTs and begin testing of the next AUT in the list once sufficient cloud resources become available. The AUTs in the list can be prioritized such, for example, by priority.

The provision manager 110 can stop the testing of an AUT when, for example, test completion criteria of an AUT have been satisfied (e.g., a specified set of test cases have been completed, the AUT has been subjected to test loads for a designated period of time). The provision manager 110 can suspend or throttle down the testing of application if an AUT with a higher testing priority is deployed to the cloud. Throttling down an application can comprise, for example, reducing the rate at which commands of the throttled-down application are executed, or applying test loads to the throttled-down application at a reduced rate. After testing of the higher-priority AUT has completed, the suspended or throttled-back AUT can be throttled up or resumed. After testing of an AUT has finished, the provision manager can undeploy the AUT from the cloud.

In some embodiments, the provision manager 110 can dynamically manage the health of an AUT through monitoring agents deployed to the cloud. For example, monitoring agents deployed to a cloud in which an application is being tested can be configured to supply usage metrics to the provision manager 110. Usage metrics can include application response time, application throughput, CPU utilization, storage usage and other parameters. These usage metrics can be used by the system 100 to determine whether an AUT or underlying cloud resources are to be scaled up or down.

The application manager 120 is capable of configuring virtual machines to run instances of an AUT on cloud infrastructure made available to a software developer by a cloud service provider. Multiple virtual machines can be run on a single server, with the multiple virtual machines running the same or different operating systems. The application manager 120 is further capable of dynamically scaling an AUT, while the AUT is being tested. For example, the application manager 120 can be configured to increase or decrease the number of AUT instances executing in the cloud while the AUT is being tested. The application manager 120 is further capable of scaling the number of virtual machines available to testing the application, and the amount of cloud infrastructure (e.g., the number of servers, storage space) made available to test an AUT in response to changes in the test load. Application, virtual machine and cloud infrastructure scaling can be performed in response to changes in the test load applied to the AUT (e.g., changes in test load volume), determining that usage metrics have exceed or dropped below maximum or minimum usage thresholds, respectively or other events.

The application manager 120 is also capable of configuring test loads to be applied to an AUT. The application manager 120 can be used to configure test loads and to specify test loads. For example, the application manager can be used by a test user to determine which use-cases are to be included in a particular test load and the test load source from which the test load is to originate. A test load can originate from a server within or external to a cloud in which an AUT is being hosted.

The network manager 130 controls an enterprise's private cloud. In some embodiments, network-level services typically delivered by separate physical devices, such as firewalls, VPN (virtual private network) devices and load balances, can be provided by the system 100. The network manager 130 can provide for the connection of an AUT hosted on a private cloud to the AUT hosted on a public cloud by, for example, a virtual private network (VPN).

The server manager 140 is configured to provide management of an AUT's test environment. The server manager 140 allows for manual configuration of cloud infrastructure resources for testing AUTs. For example, a user can configure a particular AUT to run on 100 of 200 servers allocated to a developer in a cloud. The server manager 140 automates operations and processes across disparate IT applications. The server manager 140 can also participate in the scaling of cloud resources (e.g., test servers, virtual machines) made available for testing an AUT.

The storage manager 150 is configured to scale the amount of storage allocated to an AUT during testing. For example, the storage manager 150 can allocate additional storage to an AUT in response to determining that the amount of memory used by an application during testing exceeds a specified threshold. Cloud service providers can abstract the physical location of application data to allow for location independence of AUTs. A cloud service provider can present to an application a logical space for data storage and can handle the mapping of the logical space to the actual physical location of the memory.

The test monitor 160 monitors the usage of cloud infrastructure while an AUT is being tested. For example, the test monitor 160 can comprise monitoring agents that monitor the usage of virtual machines on which AUTs are running and generate usage metrics. The monitoring agents can generate a broad range of usage metrics, including related to application and test server data (e.g., information indicating issues encountered with the processing of test loads (e.g., test cases within the test loads) and configuration scripts); metrics pertaining to an AUT's consumption of virtual or physical machine resources (e.g., CPU utilization, memory usage); network data (e.g., response time, throughput, connectivity between virtual and physical machines); storage data (e.g., disk utilization), and AUT queue length (e.g., how many AUTs have been deployed to the cloud and are awaiting testing). Usage metrics can be generated by the agents and sent to a central server, where they can be accessed and analyzed by other components of the system 100.

For example, the provision manager 110, application manager 120 or server manager 140 can analyze the usage metrics to decide whether to scale the AUT or cloud infrastructure. Any actions performed by the system 100 on the cloud infrastructure can be recorded in a central repository for audit purposes. Usage metrics can also be used to generate usage reports and billing records. The billing records can be generated per user level (e.g., admin, user).

The cloud service providers 170 are entities that provide cloud resources (e.g., computing, network, platform, application, storage and other resources) to software application developers and other customers.

The system 100 can operate on one or more of any of the computing devices described herein. The system 100 can comprise a unified management console that allows admins 180 and test users 190 to access the system 100 and manage testing of applications. The unified management console can be web-based, thereby allowing admins and test users to control the testing of applications remotely.

Example 2

Exemplary Clouds

The cloud-based testing technologies disclosed herein can test applications in various types of clouds. For example, an application can be tested in one or more public, private or hybrid clouds. In general, public clouds are run by cloud-based providers for public use, and applications from various software developers can be mixed together on a private cloud's servers, storage systems, and networks. Private clouds are generally owned and operated by a single entity. For example, a software application developer can have its own private cloud; the enterprise owns the private cloud infrastructure and has control over how applications are deployed to the private cloud.

Hybrid clouds comprise public and private clouds. Hybrid clouds can provide cloud infrastructure on demand beyond what a private cloud alone can provide, with excess infrastructure provisioned by a cloud service provider operating a public cloud. The ability to augment a private cloud with public cloud resources can be used to maintain application testing service levels (e.g., application response times guaranteed by a cloud service provider) in response to test load fluctuations and other events.

A cloud-based testing system is configured to interact with any of the clouds through APIs provided by various clouds and cloud service providers.

Example 3

Exemplary Virtualization Machines for Cloud-Based Testing

In any of examples herein, AUTs deployed to a cloud can be isolated from one another through the use of virtualization technologies. Virtualization technologies provide isolation and security to application co-hosted in the same cloud by encapsulating individual applications in virtual machines.

In some embodiments, cloud infrastructural resources are allocated to virtual machines in one of two modes: conserving mode and non-conserving mode. In conserving mode, if a virtual machine needs more cloud resources than those allocated to an application or available under a software developer's account, available cloud resources are not allocated to the virtual machine. In the non-conserving mode, available cloud resources can be allocated to a virtual machine needing the additional resources.

Example 4

Exemplary Application Configuration

In any of the examples herein, an application under test can be configured for testing by a cloud-based test system. Application configuration can comprise specifying a particular cloud or server on which an application is to be tested. A cloud or server can be specified by, for example, cloud or server name, or geographic location. For example, a user can specify the continent (North America), region (West Coast), state (Oregon) or other geographical region in which the cloud or test server to host the application is to be located.

Particular hosting machine (physical or virtual) machine requirements, such as minimum CPU and memory requirements, can also be specified for an AUT. A user can specify minimum run-time characteristics of an application or a cloud such as application response time, throughput, memory usage, cloud storage used by the application, network bandwidth consumed by the application during testing of an application. The cloud service provider can use these values to determine whether an application or cloud resources are to be scaled during application testing.

Example 5

Exemplary User Roles

FIG. 1 shows two types of users (user roles) that can interact with a cloud-based testing system 100, admins 180 and test users 190.

Admins 180 have full access to the system 100. An admin's responsibilities can include configuring an application on a cloud service provider, and configuring operational and network policies. Operational and network policies can be defined during the application and test server onboarding phase depending on the requirements to be met by the cloud and define conditions (e.g., minimum network conditions (bandwidth, response time) and allowed actions for an AUT. Operations that an admin 180 can perform include deployment and un-deployment of applications to a cloud; configuration and monitoring of applications and cloud infrastructure; executing an application for testing; setting up and managing access points; viewing application test reports; and auditing application testing. Admins 180 are generally employees of a testing services provider, an entity that provides components of a cloud-based testing system.

Test users 190 are users generally associated with a software application developer. A test user 190 can perform operations on the system 100 to manage an AUT. Operations that can be performed by a test user 190 include requesting deployment of an application and a test server on a selected cloud, running a test on a selected application in the cloud, downloading and viewing test results, registering new users and assigning roles to new users, and configuring cloud servers for testing applications.

Admins 180 and test users 190 can access the system via a unified management console via a browser using a secure protocol, such as the secure socket layer protocol (SSL).

Example 6

Exemplary Test Architecture

Figure 2:
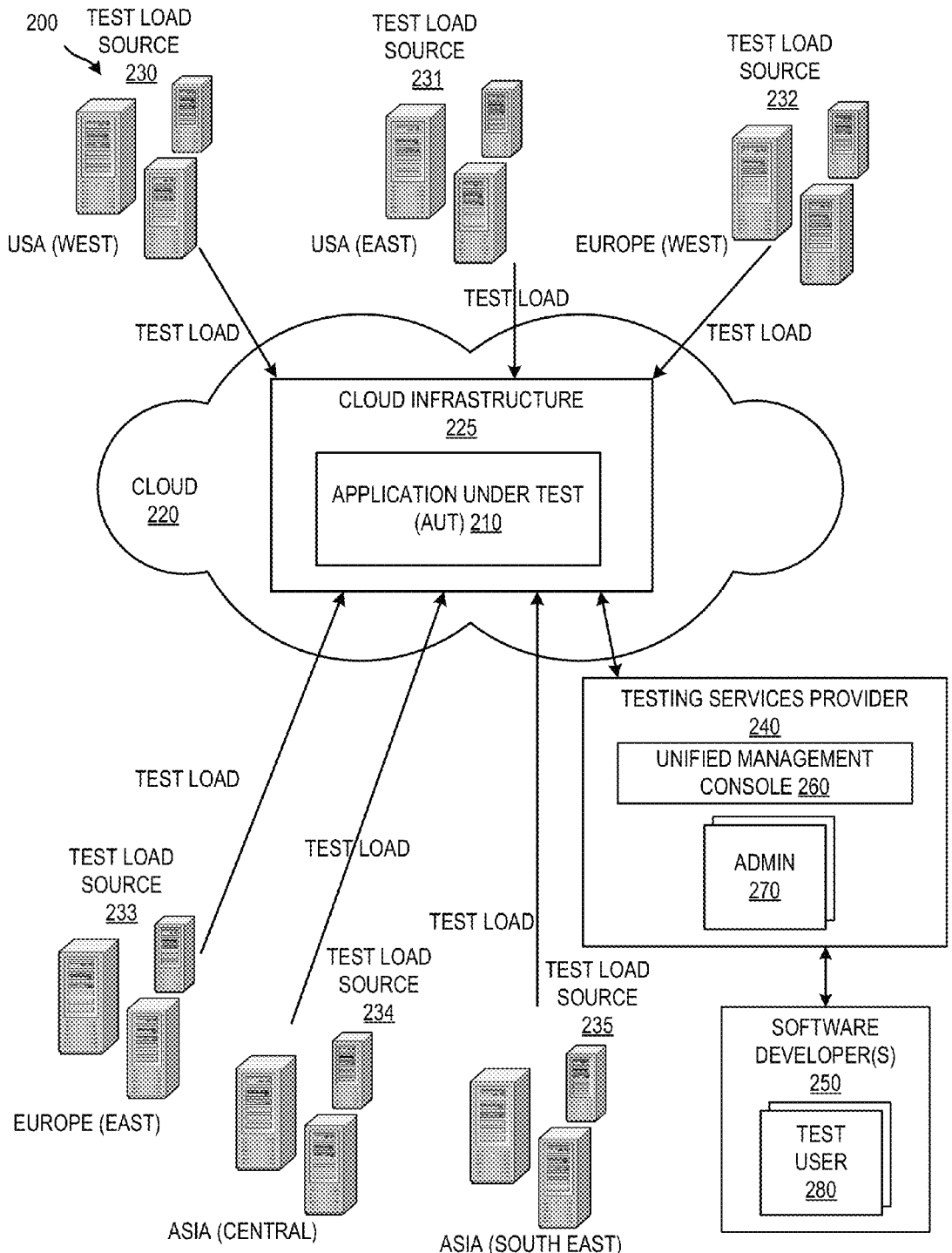
FIG. 2 is a diagram of a system for testing applications in a cloud.

FIG. 2 is a diagram of a system 200 for testing an AUT 210 in a cloud 220. The system 200 comprises a cloud 220 comprising cloud infrastructure 225 and test load sources 230-235. A testing services provider 240 in communication with the cloud 220 manages testing of the AUT 210. Software developers 250 utilize testing services provided by the testing services provider 240 to test their applications. The cloud 220 can be multiple clouds of varying types, such as a private, community, public or hybrid cloud. The cloud infrastructure 225 can comprise computing, networking, storage and other cloud resources and includes one or more virtual machines on which the application under test 210 is executing and tested. The AUT 210 can comprise one or more instances of the application.

The test load sources 230-235 can be any computing device or sets of computing devices capable of applying a test load to the AUT. For example, the test load sources 230-235 can be servers within a data center or cloud external to the cloud 220 that apply test loads to the AUT 210 by sending test loads over the Internet, or, the test load servers can be servers within the cloud 220 that send test loads to the AUT 210 over an intra-cloud network connections. The test load sources 230-235 can be geographically distributed (globally, nationally, regionally, etc.) in order to allow the AUT 210 to be subjected to test loads representative of real-time actual loads the AUT is expected to be subjected to when the application is operating in a production environment. Thus, the test load sources 230-235 can be located in a plurality of different time zones.

For example, if the AUT is an email application, testing of the AUT can include application of test loads originating from test load sources 230-235 to the AUT to mimic expected loads. For instance, the individual test load sources can be configured to generate test loads that are applied to the email AUT during typical peak email usage hours (e.g., 9:00 AM-6:00 PM) local to the test load source, and that have volumes approximating expected local email usage levels. By utilizing clouds as test load sources for generation of test loads, high volume real-time production-level loads can be generated and applied to the AUT. Thus, rather than having to extrapolate application behavior from test loads that only represent a portion of expected production loads, application developers can evaluate application performance based on actual test loads applied to an AUT.

The testing services provider 240 provides the software developers 250 with access to cloud facilities for testing applications and for the management of cloud-based application testing. In some cloud-based testing system embodiments, the provision manager, application manager, network manager, server manager, storage manager and test monitor can be provided by the testing services provider 240, and operate on computing infrastructure of the testing services provider 240, which can be separate from the cloud 220. In various embodiments, the testing services providers 240 can provider a unified management console 260 that can be accessed by admins 270 and test users 280. The unified management module can web-based, allowing admins 270 and test users 280 to remotely manage testing of the AUT 210.

Example 7

Exemplary Test Loads

The test loads described herein can, in addition to being configured to apply test inputs specific to the application being tested (e.g., email test load for email applications) can be configured in other manners. For example, test loads can be configured to originate from a specific computing platform, a test server running a specific operating system, be delivered at a specified bandwidth, or a specific geographic location or region. Test loads can be further configured to originate from test load sources such that the test loads are delivered to the AUT over a variety of network paths, such as over various Internet backbones. In some embodiments, an admin or test user can specify a desired test condition and the cloud-based system can determine the test load sources therefrom. For example, a user can specify that test loads for an AUT are to come from five different test load sources located on different continents, cities, time zones, or that satisfy other constraints (e.g., the test loads are to travel over X different Internet backbones before arriving at the AUT), and the system can automatically select test load sources that satisfy the constraints.

Test loads can comprise various types of tests such as functional and non-functional tests, stress tests, endurance tests, spike or peak-load tests, performance tests and configuration tests.

In a first exemplary test scenario, test loads can be configured to approximate users spread over at least three widely distributed geographic regions (e.g., Europe, Asia and South America), and the application can be hosted at a server located in North America. The application can be configured with testing criteria specifying that the response time of the application is to not vary more than two seconds across test load sources.

In a second exemplary test scenario, a test application can be hosted by servers located in North America and test loads can be applied to the application that mods a user base of 20 million users running a variety of use cases. The application can be configured with test criteria specifying that 99% of functional test cases are to be met, and the application is to be available 99.9% of the time during testing and responds within a specified response time. If application availability or response time metrics drop below the specified amount during testing, the system can scale up application and cloud infrastructure resources in an attempt to improve availability and response time metrics.

In some embodiments, test loads are generated at the test load sources by test load modules generated at systems operated by the test services providers and delivered to the test load sources by the test services provider systems. The system 100 can configure the test load modules such that they send a test load to an AUT when, for example, appropriate control commands are received by the test control modules, such as a signal generated by the system 100 when a test user or admin has indicated that testing of AUT has begun, or when conditions specified within the test module are satisfied (e.g., time and date parameters indicating when a test load module is to begin generating a test load are satisfied).

Example 8

Exemplary Configurability

In any of the examples described herein, a cloud-based testing system can comprise standard web-based interfaces for interfacing with cloud service providers. Testing systems comprising standard web-based interfaces can be used to deploy the test server components, enterprise application and modules or services within an application to the clouds. The disclosed cloud-based testing systems are configurable to change with application testing needs. For example, a cloud-based system can include modules in addition to those shown in FIG. 1, and the modules shown in FIG. 1 can be updated.

The cloud-based testing systems described herein can be configured to handle variations in test load across geography. The system can be configurable via configuration files that depict test environment topology (e.g., where an AUT is being hosted, and where test loads originate from). These configuration files can have information about the AUT, credentials for the cloud hosting the AUT (e.g., information needed by the system to access clouds hosting the AUT, or clouds for which test load are to originate, topological constraints such as network bandwidth, peak hour load and the like). The test load sources can utilize configuration information as part of generating the test load. For example, the test load sources can configure the test loads being delivered to the AUT such that the test loads are delivered during off-peak hours, or scaled back during peak hours.

Example 9

Exemplary Provisioning Engine

In any of examples described herein, an AUT can be deployed to one or more clouds by a provisioning engine that is part of a cloud-based testing system. In some embodiments, the provisioning engine can comprise a provision manager, such as the provision manager 110 in FIG. 1. The provisioning engine can determine in what order AUTs are tested, and in what order components or tiers within individual AUTs are executed. The provisioning engine iterates through deployment actions to the test servers hosting the AUT and configures the test servers for testing the AUTs.

In general, provisioning actions can include resource (e.g., CPU, memory, network) allocation and de-allocation, starting and stopping of applications, etc. Further, a prioritization engine can update an associated infrastructural repository with a current set of provisioning actions taken. If a set of actions to be performed in connection with a given request fail, the provisioning engine can update the status of the set of actions in a datastore, and send a message to the prioritization engine indicating failure of the set of actions, and the provisioning engine can take appropriate action in response, such as repeating the failed action.

Example 10

Exemplary Test Method

Figure 3:
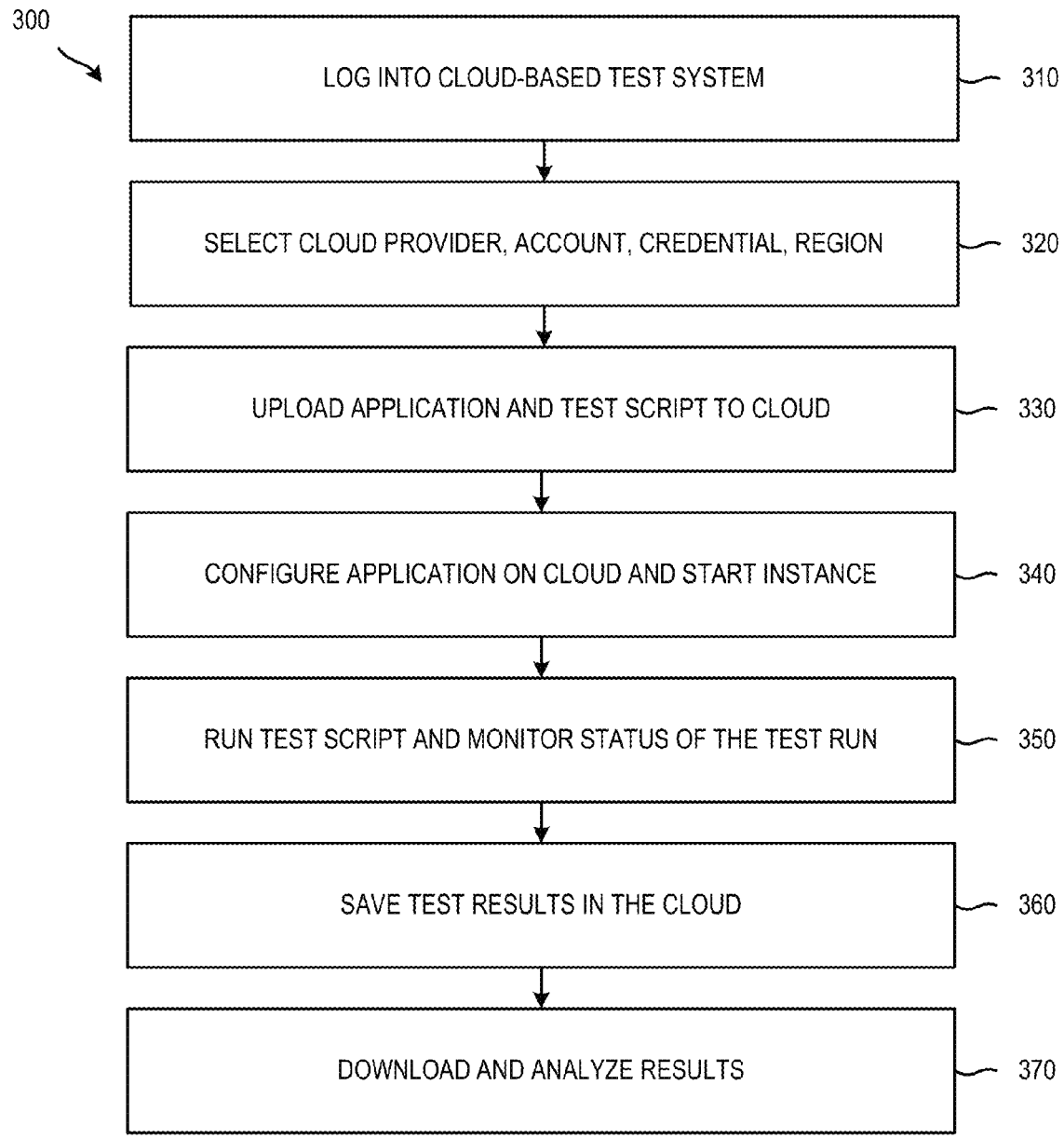
FIG. 3 is a flow chart of a first exemplary method of testing an application with a cloud-based test system.

FIG. 3 shows a flow chart of a first exemplary method 300 of testing an application with a cloud-based test system. At process block 310, an admin logs into a cloud-based test system with their user credentials. At process block 320, the admin selects a cloud service provider operating the cloud on which application testing is to be performed, an account that the software application developer has with the selected cloud service provider, credentials to log into the selected account, and a geographical region where the servers on which the application to be tested are located. At process block 330, the admin uploads an application for testing (AUT) and a test script to the selected cloud. At 340, the admin configures the AUT on the cloud and initiates execution of an instance of the AUT.

At 350, the admin runs a test script that causes a test load to be applied to the AUT and monitors the status of the test run. At 360, test results are saved in the cloud. At 370, the admin downloads and analyzes the test results.

The exemplary method 300 can comprise additional steps. For example, prior to uploading the AUT, the admin can view a list of active and inactive instances of applications already deployed in the cloud and related details. Active application instances are those instances that are currently executing and being tested, and inactive application instances are instances not currently executing. In addition, after downloading and analyzing the test results, the admin can run additional tests on the AUT, monitor the test, and download and analyze the results of the additional tests.

Example 11

Exemplary Platform Integration

In any of the examples described herein, an application developer can have multiple applications for which the developer wishes to perform cloud-based testing, and the developer can have multiple accounts or projects set up with a cloud service provider. An account or project can have single or multiple cloud infrastructure requirements (e.g., computing, storage, network and security requirements). A set of cloud infrastructure requirements can be associated with an individual project or account, and an AUT in an account or project.

The cloud-based testing system described herein can interact with clouds via APIs provided by the cloud service providers. The system interacts with the clouds through the APIs to perform application testing-related tasks such as deploying and configuring an application for testing, monitoring cloud infrastructure usage metrics and scaling the number of application instances in response to changes in the test load.

Cloud service providers can have authentication mechanisms that vary among providers. The system can comprise specific GUIs (graphic user interfaces) for users to authenticate themselves to various service providers so that the users know for which cloud providers they are providing authentication credentials.

Example 12

Exemplary Cloud Accounts

Figure 4:
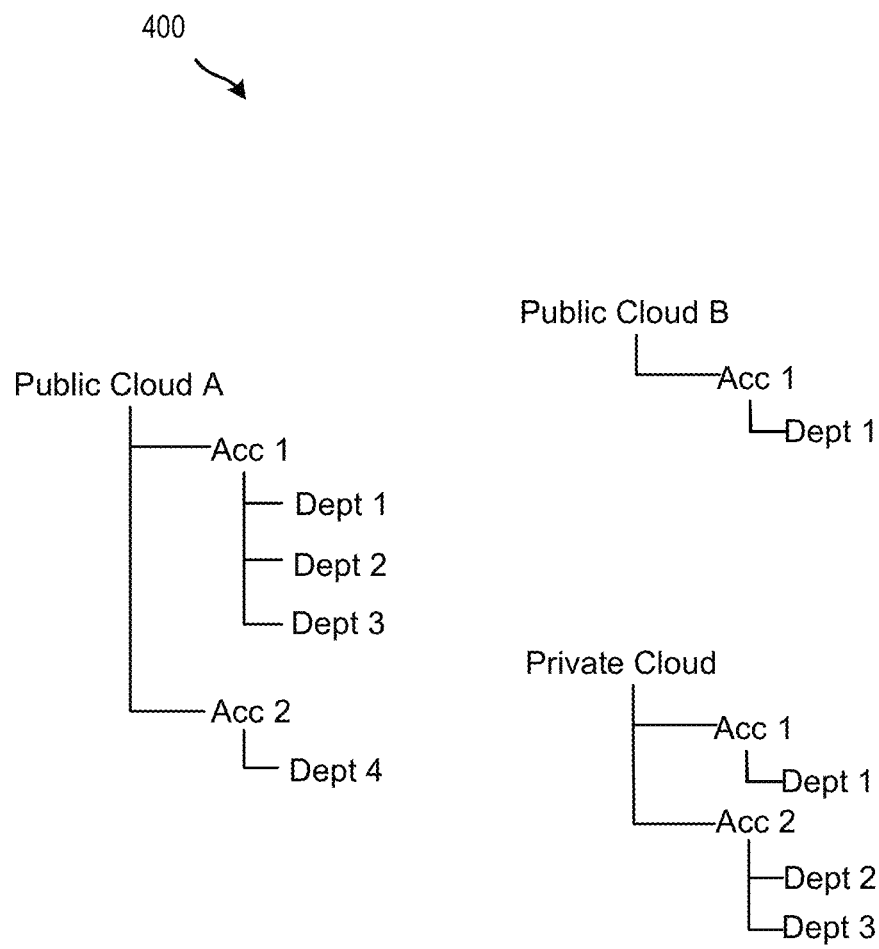
FIG. 4 is an exemplary arrangement of software developer accounts with several cloud-based service providers.

FIG. 4 is an exemplary arrangement 400 of software accounts with several cloud-based service providers. As shown, a software developer can have multiple accounts associated with a particular cloud provider for various departments, projects, units or other divisions, and can restrict certain departments or units to certain accounts within certain clouds.

In the exemplary arrangement 400, the developer has two accounts for public cloud A, with three departments able to access the first account and a fourth department able to access the second account; an account for public cloud B assigned to one department; and two accounts for a private cloud, with one department able to access the first account and two other departments able to access the second account.

Example 13

Exemplary Role-Based Access

In any of the examples described herein, a cloud-based testing system can comprise role-based access in which a user's privileges can be based on various factors including a particular AUT, the user's role and related permissions.

Figure 5:
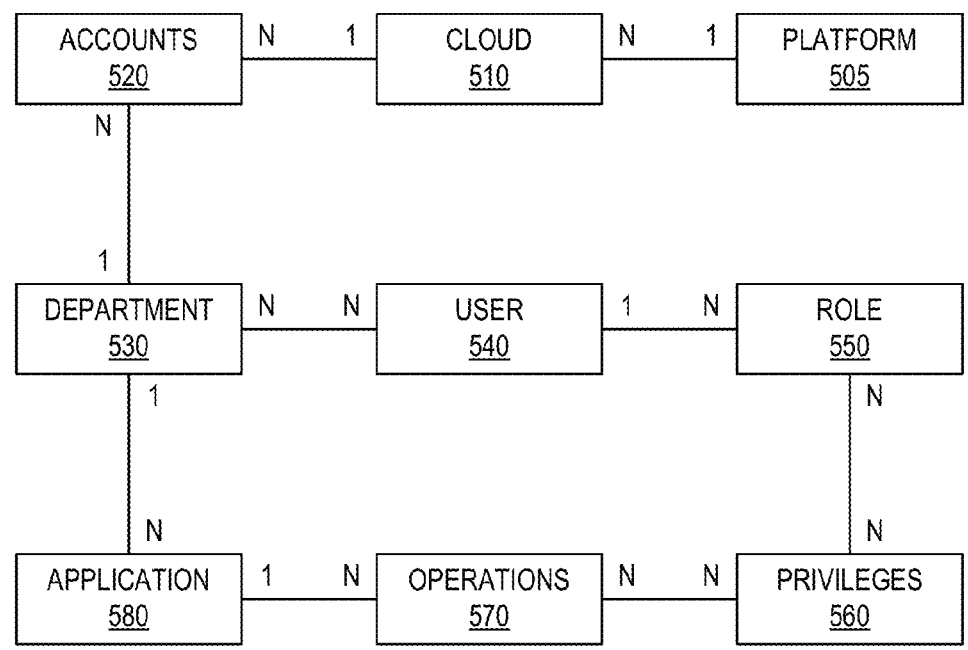
FIG. 5 shows an exemplary role-based access configuration for a cloud-based test system.

FIG. 5 shows an exemplary role-based access configuration 500 for a cloud-based test system. A cloud platform 505 (e.g., an operating system, programming language execution environment, database and web server combination) can integrate multiple clouds 510 (indicated by the 1-N relationship between the platform 505 and the cloud 510). A particular cloud can have multiple accounts 520 for a developer. The accounts can vary, for example, in the amount of cloud resources (e.g., computing, network, storage, security) allocated to an account, or represent accounts associated with various departments or projects within the developer enterprise.

A department 530 within a software application developer enterprise is associated with multiple accounts 520 and manages testing of multiple applications 580 on a cloud 510. A department 530 comprises multiple users 540, and a user 540 can belong to multiple departments 530. A user 540 is assigned multiple roles 550 (e.g., admin, test user) to which privileges 560 are attached. A privilege 560 indicates the operations 570 a user can perform on an application 580. Multiple operations 570 can be performed on an application 580, and a privilege 560 can be associated with multiple roles 550.

Role-based access control allows for customized control of application testing on a user-by-user basis. For example, a particular user can be assigned multiple roles, with individual roles having various privileges. For instance, a user can be assigned a role that has the associated privilege of the user being able to perform an "upload a test script" operation to the cloud. Another role could allow a user to run test scripts, download test reports and access an application's root directory operations. Yet another role could allow a user to download test reports and access an application root directory. Users can be identified by a user name and authenticated using a password.

As a user 540 is assigned to a department 530, which in turn can have access to multiple applications 580, a user 540 can be restricted to perform operations on a subset of applications under test associated with a developer.

Example 14

Exemplary Comparing of Application Performance Across Clouds

In any of the examples herein, the performance of an application in a particular cloud can be compared and analyzed against the performance of the application in a different cloud. Performance parameters by which an application can be measured and analyzed include cloud resource usage, service type and capacity of the infrastructural resources. These parameters can be utilized by the software developers to modify their use of cloud resources for application testing and to select a set of cloud resources (e.g., computing, network and storage resources) from multiple cloud service provided capable of delivering the set of cloud resources. For example, if cloud resource usage parameters indicate that a developer is using the full cloud resources available in a particular account, the developer can modify the account so that lesser cloud resources are available, thereby reducing cloud resource usage expenses.

Example 15

Exemplary Comparing of Application Performance Across Clouds

In any of the examples described herein, the testing of an application using a cloud-based testing system can comprise five software development life cycle phases: feasibility, on-boarding, pre-test, testing and off-boarding.

In the feasibility phase, a study of the feasibility of a cloud service provider to an application is conducted. A feasibility study can comprise a technical feasibility study and an infra-structure feasibility study. In some embodiments, the technical feasibility study comprises determining: the ability of an application to "scale out" (i.e., the ability of an application to handle an increased test load by increasing the number of instances of the application), the compatibility of the application with a cloud service provider platform, the amount of cloud infrastructure for testing the AUT (e.g., the amount of hardware and software a cloud service provider should possess to host and run an application), the availability of the required hardware and software, and determining whether a cloud service provider can deliver a specified level of performance for testing the application (e.g., whether the cloud can handle a specified test load, guarantee a specified application response time). The infrastructure feasibility involves determining whether sufficient cloud infrastructure resources are available so that projected testing demands can be met. A feasibility report can comprise the results of the two technical and infrastructure feasibility studies. The deployment of an application and test servers allows testing to proceed to the on-boarding phase.

In the on-boarding phase, a cloud service provider's run-time characteristics are compared with application characteristics using run-time profilers. The results of this comparison can be used to identify one or more accounts that can be selected (or offered to a test user or admin for selection) for testing the application. This comparison can also be used to create policies or rule-sets that define a minimum set of cloud resources a cloud service provider is to provide during testing of an application. An application is available for testing after the on-boarding activity is completed.

In the pre-test phase, an application is hosted in a simulated test environment. The simulated test environment allows a developer to verify and validate a cloud service provider's findings regarding an application's run-time characteristics and agree on the policy, rule-set, account to be used for testing the application. After the pre-test phase is completed, testing of the application in the cloud can commence.

In the testing phase, an application is made accessible to admins and test users. If the AUT behaves differently in the testing phase as compared to its behavior in the pre-test phase (i.e., in the simulated test environment), the amount of cloud infrastructure dedicated to testing the application may be insufficient. In this situation, additional resources can be automatically provisioned (e.g., additional application instances, virtual machines and test servers can be provisioned) so that testing can proceed. The behavior of the cloud in failing to provide insufficient resources for testing the application can be recorded for auditing purposes.

In the off-boarding phase, application testing has completed and a user has indicated to the system that the application is to be terminated. During the off-boarding of an application, data related to the application test, such as test results and application and cloud infrastructure usage metrics, can be transferred to a repository (which could be located in the cloud that performed the testing, or elsewhere). In some embodiments, only a summary of the test results (i.e., a test report) is retained.

In various embodiments, the software development life cycle for a particular application could have more or fewer steps that those listed above. For example, a developer could elect to skip the pre-test phase for an application.

Example 16

Exemplary Method of Testing an Application Using a Cloud-Based Test System

Figure 6:
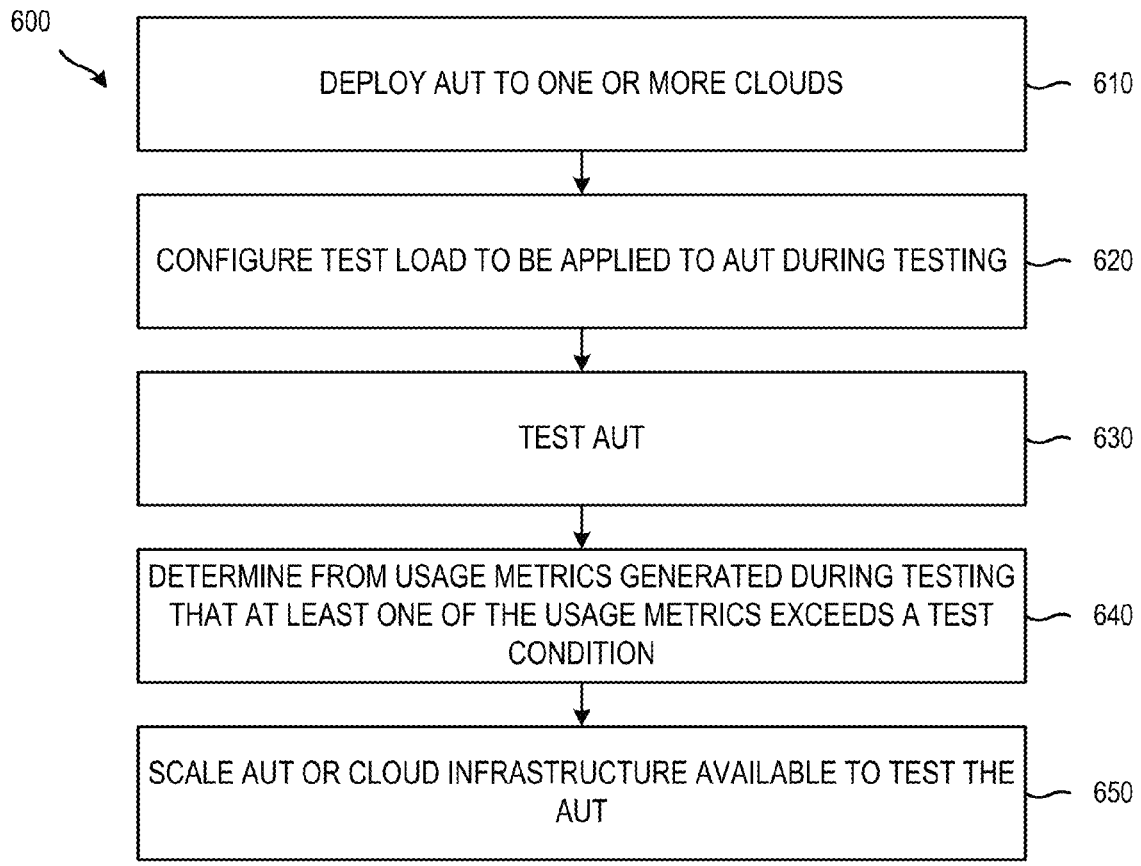
FIG. 6 is a flowchart of a second exemplary method of testing an application with a cloud-based test system.

FIG. 6 is a flowchart of a second exemplary method 600 of testing an application using a cloud-based test system. The method 600 can be performed, for example, by a server of a testing services provider executing cloud-based testing software.

At process block 610, an application under test (AUT) is deployed to one or more clouds for testing. In the example, an admin can access the testing services provider server to deploy the AUT to a cloud for testing. At process block 620, the test load to be applied to the AUT during testing is configured. In the example, the testing server configures the test load to be applied to the AUT during testing. The test loads are based on input provided to the testing server by the admin. In some embodiments, the testing server can automatically configure a portion of the test load based on admin input.

At process block 630, the AUT is tested. In the example, the admin initiates testing of the AUT via the testing server. In some embodiments, the testing server can automatically initiate testing of the AUT due to cloud resources becoming available, or the time at which the AUT is scheduled to be tested having arrived. At process block 640, it is determined from usage metrics generated during testing that at least one of the usage metrics exceeds a test condition. In the example, a monitoring agent deployed to the cloud that monitors application response time measures an average response time of 8 seconds over the past 10 minutes, which exceeds the test condition that the application is to have a response time of less than 5 seconds of a 10 minute span.

At process block 650, the AUT or cloud infrastructure made available to scale the AUT is scaled. In the example, the test server causes additional instances of the AUT to be started in an attempt to reduce application response time. In some embodiments, the test server can increase the number of virtual machines to run the additional AUT instances, and can also increase the amount of cloud infrastructure (e.g., test servers, storage, network bandwidth) in response to determining that the average response time exceeds the specified response time test condition.

In various embodiments, the method 600 can comprise more or fewer steps than those shown. For example, the method 600 can further comprise deploying a second AUT to the cloud that has a higher priority than the first AUT, testing the second AUT, throttling down or suspending testing of the first AUT while the second AUT is being tested, and throttling up or resuming the testing of the first application after testing of the second AUT has been completed. In the example, the test provider server can deploy the second AUT, initiate testing of the second AUT, throttle down the first AUT while the second AUT is being tested, and throttle up testing of the second AUT once testing of the first AUT has been completed.

Exemplary Advantages

The disclosed cloud-based testing technologies have at least the following exemplary advantages. The disclosed technologies allow for high volume load testing, performance benchmarking and product/service certification, etc. The disclosed technologies allow software developers to leverage cloud infrastructure to apply real-time test loads approximating loads that applications are to be expected to be subjected to when released. The test loads can originate from geographically distributed test load sources to approximate expected loads originating from around the world or other geographical areas.

Further, the technologies disclosed herein allow for dynamic scaling of applications and cloud infrastructure (e.g., virtual machines, cloud resources allocated to a developer account) while an application is being tested.

Moreover, the testing of an application in phases (e.g., feasibility, on-boarding, pre-test, test, off-boarding) allows for the identification of defects and bugs early in a software project. If a bug is detected later in a software development life cycle, its impact on the project can be higher and fixing it can take more effort and hence cost more to fix.

Furthermore, the disclosed technologies provide application testing as a service (TaaS), rather than having a software application developer build their own testing infrastructure to test their applications. The disclosed systems offer tools as well as cloud infrastructure to allow a software developer to test their applications. The test environment and applications under test can be set up using a single unified management platform.

Moreover, scaling of cloud resources based on application and cloud infrastructure provides improved utilization of cloud resources to cloud service providers, and can reduce outsourcing expenses to a software developer by the developer having to pay for cloud resources actually used.

Further, the disclosed technologies allow for high priority or critical applications to be tested regardless of whether other applications are being tested or cloud infrastructure resources allocated to a developer are otherwise being used. Applications currently being tested that have a lower priority than a higher-priority application can be throttled down or suspended to create cloud resources for the high priority application to be tested. Once testing of the high priority application has finished, testing of the lower-priority application can resume or be throttled back up. This dynamic scaling of testing bandwidth can be handled automatically by the cloud-based systems described herein.

Exemplary Computing Environment

The techniques and solutions described herein can be performed by software and/or hardware of a computing environment, such as a computing device. Exemplary computing devices include server computers, desktop computers, laptop computers, notebook computers, netbooks, tablet computers, mobile devices, smartphones and other types of computing devices.

Figure 7:
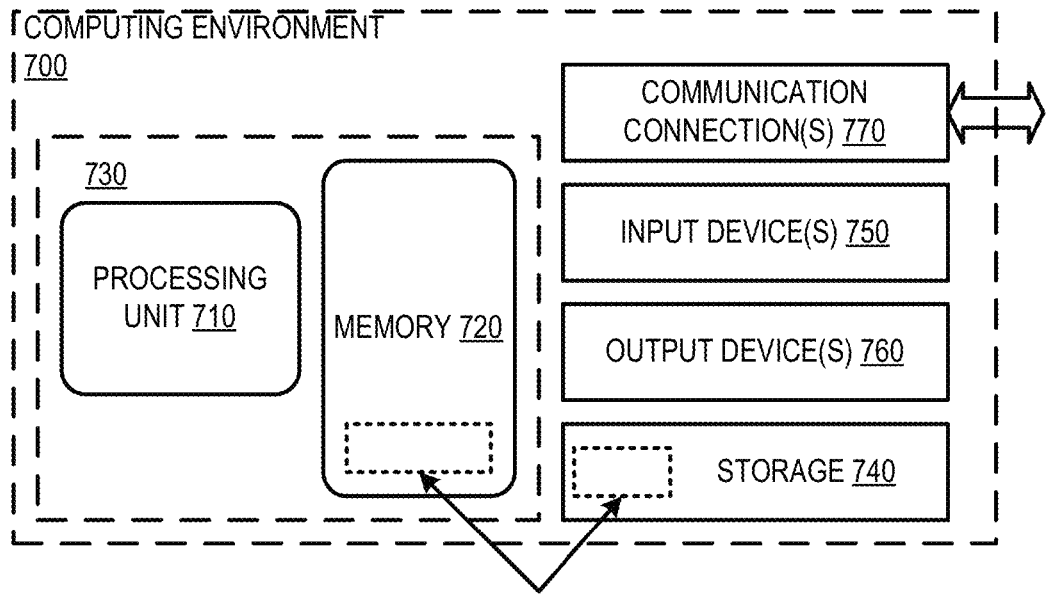
FIG. 7 illustrates a generalized example of a suitable implementation environment in which described embodiments, techniques, and technologies may be implemented.

FIG. 7 illustrates a generalized example of a suitable computing environment 700 in which described embodiments, techniques, and technologies can be implemented. The computing environment 700 can correspond to any of the computing devices described herein. The computing environment 700 is not intended to suggest any limitation as to scope of use or functionality of the technology, as the technology can be implemented in diverse general-purpose or special-purpose computing environments. For example, the disclosed technology can be implemented using one or more computing devices (e.g., a server, desktop, laptop, hand-held device, mobile device, smartphone), respective of the computing devices comprising a processing unit, memory and storage storing computer-executable instructions implementing the technologies described herein. The disclosed technology can also be implemented with other computer system configurations, including multiprocessor systems, microprocessor-based or programmable consumer electronics, network PCs, minicomputers, mainframe computers, a collection of client/server systems and the like. The disclosed technology can also be practiced in distributed computing environments where tasks are performed by remote processing devices that are linked through a communications network, such as the Internet. In a distributed computing environment, program modules can be located in both local and remote memory storage devices.

With reference to FIG. 7, the computing environment 700 includes at least one central processing unit 710 and memory 720. In FIG. 7, this most basic configuration 730 is included within a dashed line. The central processing unit 710 executes computer-executable instructions. In a multi-processing system, multiple processing units execute computer-executable instructions to increase processing power and as such, multiple processors can be running simultaneously. The memory 720 can be volatile memory (e.g., registers, cache, RAM), non-volatile memory (e.g., ROM, EEPROM, flash memory, etc.), or some combination of the two. The memory 720 stores software 780 that can, for example, implement the technologies described herein. A computing environment can have additional features. For example, the computing environment 700 includes storage 740, one or more input devices 750, one or more output devices 760 and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 can be removable or non-removable, and includes magnetic disks, magnetic tapes or cassettes, CD-ROMs, CD-RWs, DVDs, or any other tangible storage medium which can be used to store information and which can be accessed within the computing environment 700. The storage 740 stores instructions for the software 780, which can implement technologies described herein.

The input device(s) 750 can be a touch input device, such as a keyboard, keypad, mouse, touchscreen, pen, or trackball, a voice input device, a scanning device, or another device that provides input to the computing environment 700. For audio, the input device(s) 750 can be a sound card or similar device that accepts audio input in analog or digital form, or a CD-ROM reader that provides audio samples to the computing environment 700. The output device(s) 760 can be a display, printer, speaker, CD-writer or another device that provides output from the computing environment 700.

The communication connection(s) 770 enable communication over a communication medium (e.g., a connecting network) to other computing entities. The communication medium conveys information such as computer-executable instructions, compressed graphics information or other data in a modulated data signal.

The computing environment 700 can comprise web-based services. For example, a testing service provider can provide application testing services via a web-based unified management console. The console can be accessed, for example, by a mobile device such as a laptop computer, tablet computer or smartphone, or non-mobile device such as a desktop computer.

Methods in Computer-Readable Media

Any of the disclosed methods can be implemented as computer-executable instructions or a computer program product. The computer-executable instructions or computer program products as well as any data created and used during implementation of the disclosed embodiments can be stored on one or more computer-readable storage media (e.g., non-transitory computer-readable storage media, such as one or more optical media discs (such as DVDs or CDs), volatile memory components (such as DRAM or SRAM), or nonvolatile memory components (such as flash memory or hard drives)) and executed on a computer (e.g., any commercially available computer, including smartphones or other computing devices that include computing hardware). Computer-readable storage media does not include propagated signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are known in the art are omitted. For example, it is to be understood that the disclosed technology is not limited to any specific computer language or program. For instance, the disclosed technology can be implemented by software written in C++, Java™, Perl, JavaScript™, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

Any of the methods described herein can be implemented by computer-executable instructions stored in one or more computer-readable storage devices (e.g., hard disk drives, floppy disk drives, memory integrated circuits, memory modules, solid-state drives and other devices comprising computer-readable storage media). Such instructions can cause a computer to perform the method.

DEFINITIONS

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Alternatives

The disclosed methods, apparatuses and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation. In view of the many possible embodiments to which the principles of the illustrated embodiments may be applied, it should be recognized that the illustrated embodiments are only examples and should not be taken as limiting the scope of the disclosure.

We claim all that comes within the scope of the appended claims.

We claim:

1. One or more computer-readable storage media storing computer-executable instructions, the computer-executable instructions comprising:

a provision manager configured to deploy an application under test (AUT) to one or more cloud-based testing systems if cloud infrastructure resources are available and start testing of the AUT;

a test monitor configured to generate usage metrics as the AUT is being tested; and an application manager configured to scale the AUT while the AUT is being tested based on the usage metrics;

wherein the provision manager is further configured to allow a user to configure a priority for the AUT, the application manager being further configured to scale the AUT based at least in part on the priority and at least one of the usage metrics exceeding a test condition associated with the AUT;

deploying a second AUT with higher priority to the one or more cloud-based test systems; and testing the second AUT;
wherein, in response to testing the second AUT, the provision manager throttles down or suspends testing of the AUT and throttles up or resumes testing of the AUT when testing of the second AUT has been completed.

2. The one or more computer-readable storage media of claim 1, wherein the usage metrics comprises an application response time metric, and the application manager is configured to scale the AUT if the application response time metric exceeds a specified response time threshold.

3. The one or more computer-readable storage media of claim 1, wherein the application manager scales the AUT by changing a number of instances of the AUT executing on the one or more cloud-based testing systems.

4. The one or more computer-readable storage media of claim 1, wherein the provision manager is further configured to allow a user to configure one or more test loads to be applied to the AUT during testing of the AUT and to specify one or more test load sources for the one or more test loads.

5. The one or more computer-readable storage media of claim 4, wherein at least one of the one or more test load sources is external to the one or more cloud-based testing systems.

6. The one or more computer-readable storage media of claim 4, wherein the one or more test load sources comprises a plurality of test load sources that are geographically distributed.

7. The one or more computer-readable storage media of claim 1, wherein the provision manager is capable of deploying the AUT to one or more private, public or hybrid cloud-based testing systems.

8. The one or more computer-readable storage media of claim 1, the computer-executable instructions further comprising:
a server manager configured to provide management of a test environment of the AUT;
a network manager configured to manage a private cloud-based testing system on which the AUT is to be tested; and
a storage manager configured to dynamically allocate storage for the AUT based on application usage during testing.

9. The one or more computer-readable storage media of claim 1, wherein the test monitor comprises one or more monitoring agents executing in the one or more cloud-based testing systems.

10. The one or more computer-readable storage media of claim 1, the computer-executable instructions further comprising a unified management platform from which the provision manager and application manager can be accessed.

11. A method for testing a plurality of applications under test (AUT), the method comprising:
determining availability of cloud infrastructure resources for testing a first AUT, wherein the first AUT has an associated first priority;
based on the availability of cloud infrastructure resources, deploying the first AUT to one or more cloud-based test systems for testing;
configuring a test load to be applied to the first AUT during testing of the first AUT;
testing the first AUT;
determining from usage metrics generated during the testing of the first AUT that at least one of the usage metrics exceeds a test condition associated with the first AUT; and
scaling the first AUT or cloud infrastructure resources available to test the first AUT;
deploying a second AUT to the one or more cloud-based test systems, the second AUT having an associated second priority that is greater than the first priority;
testing the second AUT;
one of throttling down or suspending testing of the first AUT while the second AUT is being tested; and
one of throttling up or resuming the testing of the first AUT after testing of the second AUT has been completed.

12. The method of claim 11, wherein the test condition is one or more of an application response time and an application throughput.

13. The method of claim 11, wherein the AUT is deployed to a plurality of cloud-based test systems.

14. The method of claim 13, wherein the plurality of cloud-based test systems comprises at least one private cloud resource and at least one public cloud resource.

15. The method of claim 11, wherein the test load is configured to originate from a plurality of geographically distributed test load sources.

16. At least one computer programmed to carry out a method of testing a first application under test (AUT), the method comprising:
deploying the first AUT to one or more cloud-based test systems for testing based on availability of cloud infrastructure resources, the first AUT having a first priority;
testing the first AUT;
monitoring usage metrics generated during testing of the first AUT;
scaling the first AUT or cloud infrastructure resources if at least one of the usage metrics corresponding to cloud infrastructure usage exceeds at least one test condition for the first AUT;
deploying a second AUT to the one or more cloud-based test systems, the second AUT having a second priority that is greater than the first priority;
testing the second AUT;
one of throttling down or suspending testing of the first AUT while the second AUT is being tested; and
one of throttling up or resuming testing of the first AUT when testing of the second AUT has been completed.

17. A method for testing an application under test (AUT), the method comprising:
specifying one or more test conditions for the AUT;
based on the specified one or more test conditions, determining required cloud infrastructure resources for testing the AUT;
setting an allocation mode of the cloud infrastructure resources;
deploying the AUT with a first priority to a plurality of cloud-based test systems for testing if the plurality of cloud-based test systems provides the required cloud infrastructure resources and the required cloud infrastructure resources are currently available at the plurality of cloud-based test systems, wherein the plurality of cloud-based test systems comprises cloud infrastructure resources of at least two different types;
configuring a test load to be applied to the AUT during testing of the AUT from a plurality of geographically distributed test load sources;
testing the AUT;
monitoring usage metrics generated during testing of the AUT;
determining that at least one usage metrics corresponding to cloud infrastructure usage exceeds at least one of the one or more test conditions;

based on the allocation mode of the cloud infrastructure resources, scaling a number of virtual machines or a number of test servers available for testing the AUT;

increasing a number of instances of the AUT executing on the plurality of cloud-based test systems;

deploying a second AUT to the one or more cloud-based test systems, the second AUT having a second priority that is greater than the first priority;

testing the second AUT;

in response to testing the second AUT, throttling down or suspending testing of the AUT; and throttling up or resuming testing of the AUT when testing of the second AUT has been completed.

18. The method of claim 17, wherein the allocation mode is one of:

a conserving mode in which unused cloud infrastructure resources are not made available for the scaling; and a non-conserving mode in which unused cloud infrastructure resources are made available for the scaling.

* * * * *